US012806832B2

(12) United States Patent
Padgett

(10) Patent No.: US 12,806,832 B2
(45) Date of Patent: Nov. 24, 2026

(54) CARPET END MOLDING

(71) Applicant: Oak Valley Designs, Inc., Cartersville, GA (US)

(72) Inventor: Chappell Padgett, Cartersville, GA (US)

(73) Assignee: OAK VALLEY DESIGNS, INC., Cartersville, GA (US)

( * ) Notice: Subject to any disclaimer, the term of this patent is extended or adjusted under 35 U.S.C. 154(b) by 689 days.

(21) Appl. No.: 17/227,797

(22) Filed: Apr. 12, 2021

(65) Prior Publication Data

US 2021/0362384 A1 Nov. 25, 2021

Related U.S. Application Data

(60) Provisional application No. 63/027,048, filed on May 19, 2020.

(51) Int. Cl.

| | |
|---|---|
| ***B29C 45/14*** | (2006.01) |
| ***A47G 27/02*** | (2006.01) |
| ***B29C 43/18*** | (2006.01) |
| ***B29L 31/10*** | (2006.01) |

(52) U.S. Cl.
CPC .... *B29C 45/14467* (2013.01); *A47G 27/0287* (2013.01); *B29C 43/184* (2013.01); *B29L 2031/10* (2013.01)

(58) Field of Classification Search
CPC ............ A47G 27/0287; A47G 27/0268; A47G 27/06; B29C 43/184; B29C 45/14467
See application file for complete search history.

(56) References Cited

U.S. PATENT DOCUMENTS 4,321,294 A * 3/1982 Naka .................... E04F 11/163 428/167
2018/0347215 A1* 12/2018 Rus ......................... E04G 21/30

* cited by examiner

*Primary Examiner* — Lynda Salvatore
(74) *Attorney, Agent, or Firm* — McClure, Qualey & Rodack, LLP

(57) ABSTRACT

In one embodiment, a method of forming a product used in covering an edge, comprising: providing a molding agent between a first surface of a first material and a second surface of a second material; forming, at one end portion corresponding to each of the first material and the second material and the molding agent, a predefined geometric shape that is different than an opposing end of each of the first material and the second material; and persistently maintaining the predefined geometric shape by curing the molding agent.

8 Claims, 10 Drawing Sheets

CARPET END MOLDING

CROSS REFERENCE TO RELATED APPLICATION

This application claims the benefit of U.S. Provisional Application No. 63/027,048, filed May 19, 2020, which is hereby incorporated by reference in its entirety.

TECHNICAL FIELD

The present disclosure is generally related to carpet manufacturing, and in particular, formation of carpet ends and edges that conform to a geometric configuration of a surface area upon which the carpet is placed.

BACKGROUND

Carpeting, including rugs, mats, runners, and products that may be used for a similar purpose (e.g., for foot traffic, including turf, or for covering surfaces), is a ubiquitous feature in households in the United Stated and most of the world. For indoor and outdoor applications, carpeting may come in various shapes, sizes, colors, and materials, and may cover all or a portion of floors for living rooms, bedrooms, entranceways, stairwells, bathrooms, basements, garages, and/or covered patios, outdoor porches, landscape steps, areas surrounding a pool, etc. Carpeting generally includes an upper layer of (carpet) pile that may be manufactured in any one of a variety of ways using one or more of a variety of materials, including via a woven, non-woven, needle felt, knotted, or tufted process. For instance, in the case of the tufting process, the carpet pile is generally formed with a structural-preserving backing, which in turn is hardened and may be attached to another layer of material (e.g., cushion, plastic, etc.).

For stairways, a roll of carpeting may be continuously run along the length of the stairwell, or alternatively, cut carpet, with individual cuts or pieces (as opposed to rolls), referred to herein as treads, may be mounted (e.g., using an adhesive or non-slip layer or backing or other attachment mechanism) to each stair with no carpet spanning along the stair risers. That is, the tread extends depth-wise between the front or nose of each stair and the back or riser. One shortcoming to existing treads is the risk of one or more of the treads loosening from the stair(s), which may compromise the appearance and/or stability of the footing.

SUMMARY OF THE INVENTION

In one embodiment, a method of forming a product used in covering an edge, comprising: providing a molding agent between a first surface of a first material and a second surface of a second material; forming, at one end portion corresponding to each of the first material and the second material and the molding agent, a predefined geometric shape that is different than an opposing end of each of the first material and the second material; and persistently maintaining the predefined geometric shape by curing the molding agent.

These and other aspects of the invention will be apparent from and elucidated with reference to the embodiment(s) described hereinafter.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DESCRIPTION OF EXAMPLE EMBODIMENTS

Figures 1A, 1B, 1C, 1D, 2A, 2B, 3A, 3B:
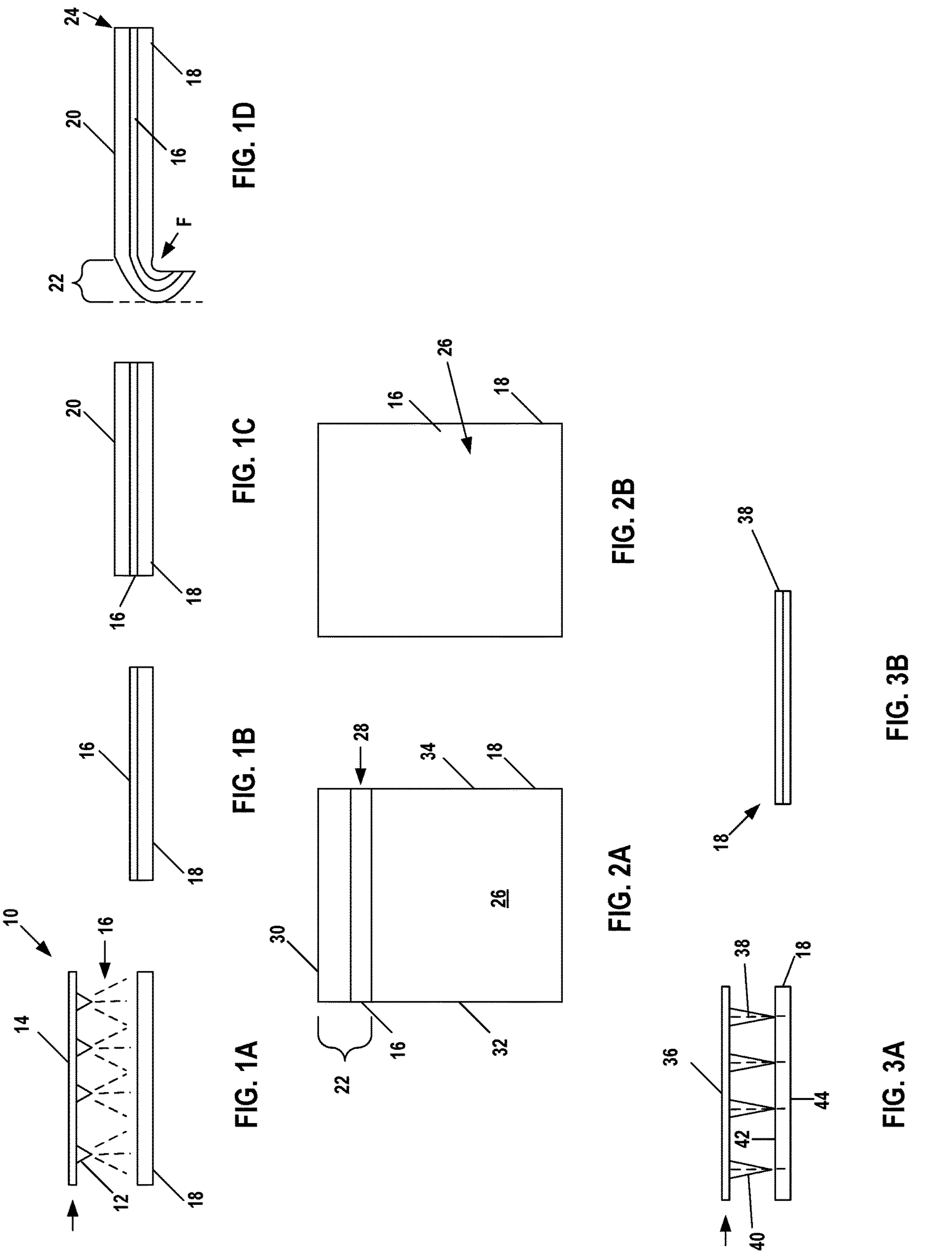
FIGS. 1A-1D are schematic diagrams that illustrate example steps in an embodiment of a method of manufacturing a molded tread via application of a molding agent.
FIGS. 2A-2B are schematic diagrams that illustrate, in overhead plan view, different example application areas of a molding agent onto a surface of a material used in manufacturing a molded tread.
FIGS. 3A-3B are schematic diagrams that illustrate a select portion of example steps in another embodiment of a method of manufacturing a molded tread via injection of a molding agent.

Certain embodiments of a molded tread and a method of manufacturing a molded tread are disclosed. In one embodiment, the method comprises forming, at one end portion of a tread comprising two materials that sandwich a molding agent, a predefined geometric shape and persistently (e.g., permanently) maintaining the geometric shape by curing the molding agent. For instance, the geometric configuration may be a rounded or square end that respectively conforms to and covers or wraps around the round or square edge or nose of an outward or front end of a stair.

Digressing briefly, some current manufacturing methods for treads for stairs of a staircase attach (e.g., adhere) a strip of rigid, thermoplastic material transversely (e.g., running the width of the tread and hence, when applied, the width of the stair) to a material that is attached to (e.g., sewn, adhered to, etc.) a backing of a carpet pile. The material that is attached to the carpet pile may be a cushion, non-slip pad, plastic layer, among other components that comprises a surface to be laid onto (e.g., adjacent) a surface of a stair. The thermoplastic material is then heated and formed via a molding apparatus (e.g., a jig) into the desired geometric configuration that, after being cured, results in a persistent state (e.g., permanent state) of the geometric configuration for a given end portion of the tread. However, the molded piece of thermoplastic material is exposed, along with and adjacent to the cushion (or other material) surface, to the surface of a stair. Though an adhesive material may be applied to both the thermoplastic and cushion surfaces (or a non-slip material may be used), these two different types of surfaces mounted onto the stair surface may result in a weaker bond/adherence to the stair, resulting in a loosening of the tread from the stair and diminished appearance, increased upkeep, and/or compromised footing from the loosened tread. In contrast, certain embodiments of a molded tread manufacturing method as disclosed herein mold one end portion of the tread using a molding agent that is not exposed to the stair surface, resulting in a cushion or other material surface with increased uniformity and improved adherence. Thus, the resulting molded tread may stay in place longer, which improves the appearance and reduces the risk of loosening from the stair surface, which may mitigate the risk of falls or slips from loosened treads.

Having summarized certain features of a method of manufacturing a molded tread and the resulting product (e.g., a molded tread), reference will now be made in detail to the description of certain embodiments of a molded tread manufacturing method as illustrated in the drawings. While the molded tread manufacturing method will be described in connection with these drawings, there is no intent to limit it to the embodiment or embodiments disclosed herein. For instance, though emphasis is on treads for indoor stair applications, some embodiments of a molded tread manufacturing method may be used for manufacturing products (e.g., treads) that may be used for outdoor applications (e.g., turf or carpet-based products) and/or for providing edge protection and/or child safety features, including edge protection for furniture, coverings to protect a child (or adult) from hard, abrasive and/or sharp surfaces, such as concrete fireplace bases, etc.

Additionally, though the carpet is described herein as a product of a tufting process, it should be appreciated that the carpet may be manufactured using any one of a variety of known carpet manufacturing methods, including via a woven, non-woven, needle felt, or knotted process, among others.

Also, the focus of the description is on the use of a carpet pile with a bonded, structured backing (e.g., nylon, polypropylene, latex, etc.) that is attached to another material, referred to also herein as a layer. For instance, certain embodiments are referenced herein that use a cushion pad as an illustrative example of the layer, where the cushion pad comprises a nonwoven, fiber pad with a non-slip pattern that is sewn to the carpet pile as one illustrative example. However, it should be appreciated by one having ordinary skill in the art in the context of the present disclosure that other types of layers may be used, including a polyvinyl chloride (PVC) rug or pad, woven or non-woven scrim, fiber pad, non-slip pad, jute, wool, or other fabrics that are known in the industry.

Further, the molding agent used depends on the manner of application and desired or required curing method. The molding agent may be any one of a variety of types of molding agents, including epoxy glue, latex with a different mix of materials (e.g., calcium carbonate, marble dust), thermoplastics including polyethylene (PE), polypropylene, PVC, polyester (e.g., polyethylene terephthalate or PET), thermosetting plastics, epoxy-based materials, among others. In general, the molding agent is of a material that can be formed under force/pressure to a desired geometric configuration and then cured to maintain that geometric shape persistently (e.g., permanently).

Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the spirit and scope of the invention as defined by the appended claims. Further, it should be appreciated in the context of the present disclosure that the claims are not necessarily limited to the particular embodiments set out in the description.

Referring now to FIGS. 1A-1D, shown are simplified schematic diagrams that illustrate example steps in an embodiment of a method of manufacturing a molded tread via application of a molding agent. FIG. 1A shows a molding agent dispensing system 10 comprising plural spray nozzles 12 coupled to a conduit 14. Molding agent 16 may flow through the conduit (e.g., in the direction of the arrow) under pressure (e.g., via a pump or gravity flow) and be dispensed onto a layer 18 via the nozzles 12. In one embodiment, the layer 18 may be in the form of a roll of material that is advanced in one direction (e.g., via a conveyor or reel, not shown) relative to the fixed, molding agent dispensing system 10 situated overhead. In some embodiments, fixed-length cuts of material may be advanced (e.g., via a conveyor). In some embodiments, the roll or cuts of material for the layer 18 may be fixed in location, and the molding agent dispensing system 10 is moved relative to the layer 18. The dispensing of the molding agent 16 is transverse to the depth or length of the layer 18 (e.g., the stair depth, from nose to riser, on which a tread is placed). For instance, the layer 18 may be advanced (e.g., in FIGS. 1A-1C, represented as into or out of the page) along a conveyor, and the molding agent dispensed along the entirety of the surface of the layer 18 or over a sub-portion (e.g., a strip) of it. The layer 18 may comprise any one or combination of a variety of materials, as explained above. The molding agent 16 may be in a liquid or vapor form of suitable viscosity to be sprayed from a nozzle. In some embodiments, particularly where the layer 18 is in the form of a roll that is unraveled onto the conveyor or advanced from a reel, a cutting operation may follow. Note that in some embodiments, the dispensing of the molding agent 16 may be achieved manually (e.g., via an operator using a tool, such as a spraying tool) while the layer 18 is either in a temporarily fixed location or while the layer 18 is advanced.

The result of the application of the molding agent 16 to the layer 18 is shown in FIG. 1B, which shows the molding agent 16 on a surface of the layer 18 (which may still be in the form of a roll or in cut lengths).

FIG. 1C shows the attachment of a carpet pile 20 to the layer 18 with the molding agent 16 sandwiched in between. The carpet pile 20 may be in the form of a roll that is reeled onto the layer 18 and molding agent, or configured in cut-lengths that are placed (e.g., via machine or manually) onto the layer 18 with the molding agent 16 sandwiched in between. In some embodiments, a sewing, stitching, or bonding process may follow to join the carpet pile 20 and layer 18 (e.g., sewed along a perimeter of each combination of pieces, among other methods for combining the components). Note that in some embodiments, the application of the molding agent 16 may be performed differently. For instance, the molding agent may be applied to the backing of the carpet pile 20 and the layer 18 is attached with the molding agent sandwiched in between, or in some embodiments, both surfaces (the backing of the carpet pile 20 and of the layer 18) may have the molding agent 16 applied. Further, though a carpet pile 20 is described, in some embodiments, other material may be used, including turf, or a covering (e.g., a decorative or non-decorative covering for edges of furniture, fireplaces, etc.)

Referring to FIG. 1D, shown is a preliminary product comprising the combination of the carpet pile 20, the layer 18, and the molding agent 16 disposed between the two materials, where one end portion 22 (e.g., the portion that may conformally wrap around a nose of a stair) is subject to a molding force (F) to transform or form the previously flat end portion 22 into a desired geometric shape (e.g., rounded shape in this example). The molding force may be achieved using a manually operated or semi-automatic or automatic molding apparatus (e.g., jig) in which the end portion 22 is placed. The geometric shape of the end portion 22 may be maintained (e.g., using a clamp, vise, or other similarly functioning mechanism) while the molding agent 16 cures, resulting in a final product (e.g., when un-clamped) that preserves or maintains the geometric shape on the end portion 22 persistently (e.g., permanently). In one embodiment, the curing of the molding agent may be achieved via application of air (e.g., dried over time or under the influence of pressurized air) and/or cooling. In some embodiments, depending on the type of molding agent 16 applied, the curing may be achieved using heat and/or air. For instance, the product may be cured by placing the product in a heating chamber. Notably, the end portion 22 comprises a different shape than the opposing end 24 (e.g., riser end) of the product.

FIGS. 2A-2B are schematic diagrams that illustrate, in overhead plan view, different example application areas of a molding agent onto a surface of a material used in manufacturing a molded tread. For instance, assuming the application of the molding agent 16 onto a surface 26 of the layer 18 (e.g., a cut-length), the molding agent 16 may be applied according to a sub-portion 28 of the layer 18, as shown in FIG. 2A. In one embodiment, the sub-portion 28 may cover an area approximately one (1) inch or two (2) inches away from an end or edge 30 of end portion 22 (e.g., defining one transverse boundary of the end portion 22) of the layer 18, extending in depth (in a direction toward the opposing end 24) anywhere from approximately one (1) to four (4) inches in some embodiments, and extending in width (transverse) from one end 32 to the opposing end 34. In some embodiments, the sub-portion 28 may be of different dimensions and/or distances from an edge 30 depending on the intended application, molding agent type, product dimensions, or thickness of the applied molding agent 16, among other factors. A similar description applies to embodiments where the molding agent 16 is applied to the backing of the carpet pile 20.

In some embodiments, the molding agent 16 may be applied to all or substantially the entire surface 26 of the layer 18 (or in some embodiments, to the carpet pile surface), as shown in FIG. 2B.

FIGS. 3A-3B are schematic diagrams that illustrate a select portion of example steps in another embodiment of a method of manufacturing a molded tread via injection of a molding agent. Injection may enable a denser or more viscous type of molding agent 16 to be used when compared to a spraying application. As shown in FIG. 3A, a conduit 36 is used to enable the flow (in the direction of the arrow) of a molding agent 38 through one or more substantially hollow needles 40 that penetrate a surface of the layer 18 (or in some embodiments, penetrate a surface of a carpet pile 20). In other words, the molding agent 38 is injected under pressure between a first surface 42 and a second surface 44 of the layer 18, resulting in the layer 18 encapsulating the molding agent 38, as shown in FIG. 3B. The layer 18 may be a roll or cut-piece. In some embodiments, the injection may be achieved after the carpet pile 20 is attached to the layer 18. For instance, in some embodiments, the needle(s) 40 may penetrate two opposing surfaces of the carpet pile 20 and one surface of the layer 18 to inject the molding agent 38 into the layer 18. As another example, the needle(s) 40 may penetrate two opposing surfaces of the layer 18 to inject the molding agent 38 between the carpet pile 20 and the layer 18. These and/or other variations are contemplated to be within the scope of the invention. In some embodiments, the scope of application may be according to a sub-portion (e.g., as explained above for sub-portion 28 in FIG. 2A) or covering the entirety of a surface (e.g., as described in conjunction with FIG. 2B). In some embodiments, the injection of molding agent 38 may be achieved manually using a tool with one or more needles 40, the tool manipulated by an operator.

Figure 4A:
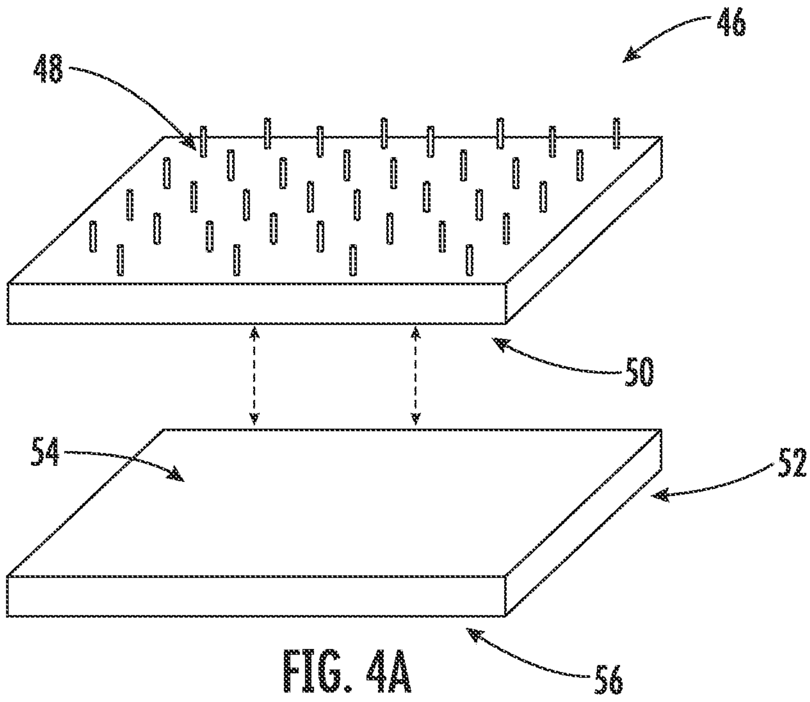
FIGS. 4A-4H are schematic diagrams that illustrate example steps in an embodiment of a method of manufacturing a molded tread via applying a molding agent through a slot opening in a surface of a material used in manufacturing a molded tread.
Figure 4B:
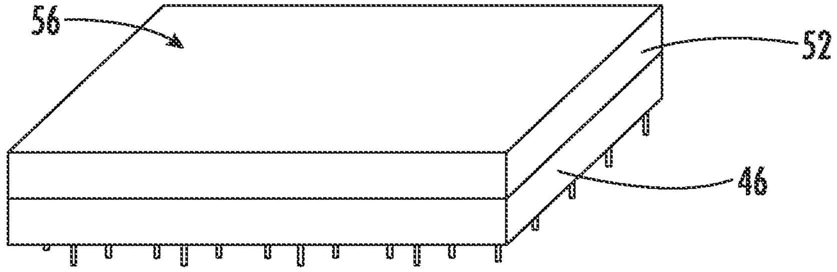

Referring now to FIGS. 4A-4H, shown are example steps in an embodiment of a method of manufacturing a molded tread via applying a molding agent through a slot (or similarly, slit) opening in a surface of a material used in manufacturing a molded tread. The method depicted in FIGS. 4A-4H provides for a cost-effective process that minimizes the need for complex machinery and/or extensive labor. With reference to FIG. 4A, shown is a carpet pile 46 having an exposed face 48 and a backing 50, as well as a layer embodied as a cushion pad 52 comprising a surface 54 that will be adjacent to the backing 50 when attached, and an exposed surface 56. For instance, if used as a molded tread, the exposed face 48 of the carpet pile 46 will ultimately be exposed to foot traffic, and the exposed surface 56 of the cushion pad 52 will ultimately be adjacent to (mounted with or without adhesive to) a stair surface. Note that the carpet pile 46 may be of a form similar to that of carpet pile 20 (e.g., FIG. 1C), including the above-described variations such as turf or other coverings of a decorative or non-decorative pattern. Similarly, the cushion pad 52 may be similar to any one of the various forms or its variations described above for the layer 18 (e.g., FIG. 1C). In FIG. 4B, the carpet pile 46 is shown attached to the cushion pad 52 such that the backing 50 of the carpet pile 46 is adjacent the surface 54 of the cushion pad 52 (represented by the double-headed, dashed arrow lines), with the exposed surface 56 of the cushion pad 52 shown facing upward (e.g., the combination flipped over during the process for illustration, compared to the manner in which it would normally be used).

Figure 4C:
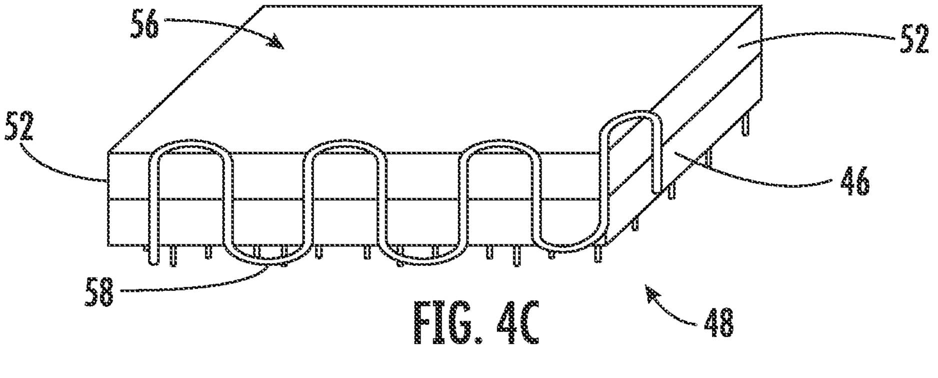

FIG. 4C further schematically illustrates an example method of attachment of the carpet pile 46 to the cushion pad 52, whereby the cushion pad edges and the carpet edges are sewn/stitched 58 together. As explained above, the method of attachment depicted in FIG. 4C is but one example of many possible methods of attachment. For instance, the carpet pile 46 and cushion pad 52 may be attached together in adjacent areas in addition to the edges, or adhered to each other along all or a portion of adjacent surfaces (e.g., via a hot or room temperature adhesive material), among other mechanisms of attachment.

Figure 4D:
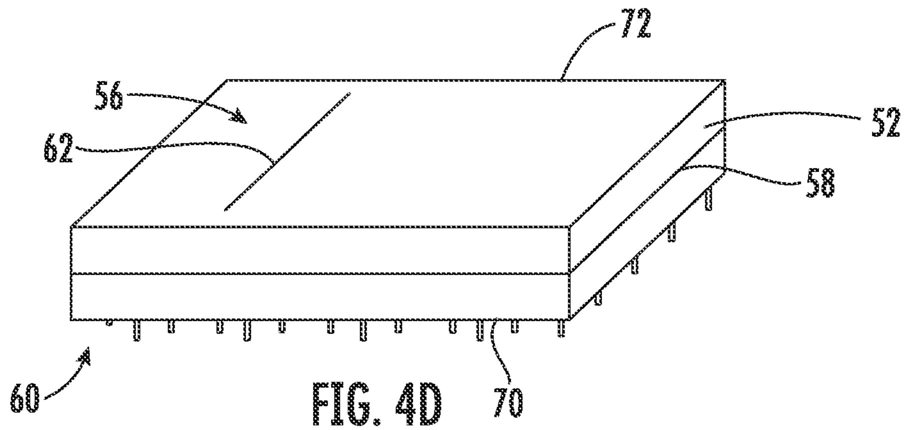
Figure 4E:
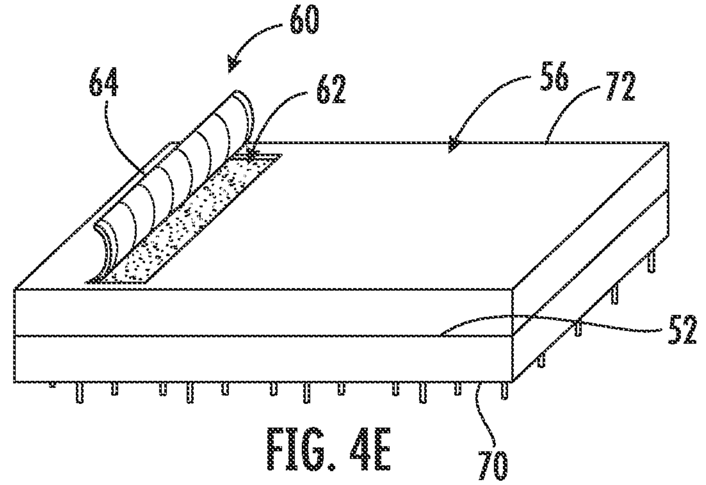

Referring to FIG. 4D, the example method includes inserting, at one end portion 60 (similar to end portion 30 of 30 of FIG. 2A) of the exposed surface 56 of the cushion pad 52, an opening in the form of a transverse slit or slot 62. The slot 62 provides an opening through which a molding agent may be applied. In one embodiment, the slot 62 may extend transversely approximately from one end 70 of the cushion pad 52 to an opposing end 72. In some embodiments, such as shown in FIG. 4E, the slot 62 may extend between the ends 70, 72 with a small margin between each side of the slot 62 and the actual ends or edges 70, 72. In practice, there may be additional, short (e.g., one-half (½) to one (1) inch) cuts at each end of the slot 62 running perpendicular to the transverse direction to facilitate pulling back loosened material 64 of the cushion pad 52. The slot 62 may be achieved via a cutting operation that is performed mechanically using a knife or other cutting tools in an automated, semi-automated, or manual cutting operation. For instance, the slot 62 may be achieved using a cross-cutting machine, whereas the additional, perpendicular cuts may be achieved manually using a sharp-edged tool or knife. In some embodiments, all or some of the cuts may be achieved using a die-cutting machine.

Upon pulling back the loosened material 64 (as illustrated in FIG. 4E) at the slot 62, a molding agent may be applied to the uncovered area of the cushion pad 52. The molding agent may be applied at room temperature, or above room temperature (e.g., four hundred (400) degrees Fahrenheit), using any one of a variety of materials as described above. In some embodiments, the application of the molding agent may be achieved manually by an operator (e.g., using a tool that upon manual activation, dispenses the molding agent), semi-automatically (e.g., the operator uses a tool to dispense the molding agent as the cushion pad 52 and carpet pile 46 are moved along a conveyor, or the operator presses a button or switch to turn on and/or off the dispensing process, etc.), or automatically (through the use of automated dispensing equipment in combination with position-detection sensors and/or visual recognition software running on a computer or electronic control unit). In some embodiments, dispensing equipment may be electrically, pneumatically, or hydraulically actuated.

Figure 4F:
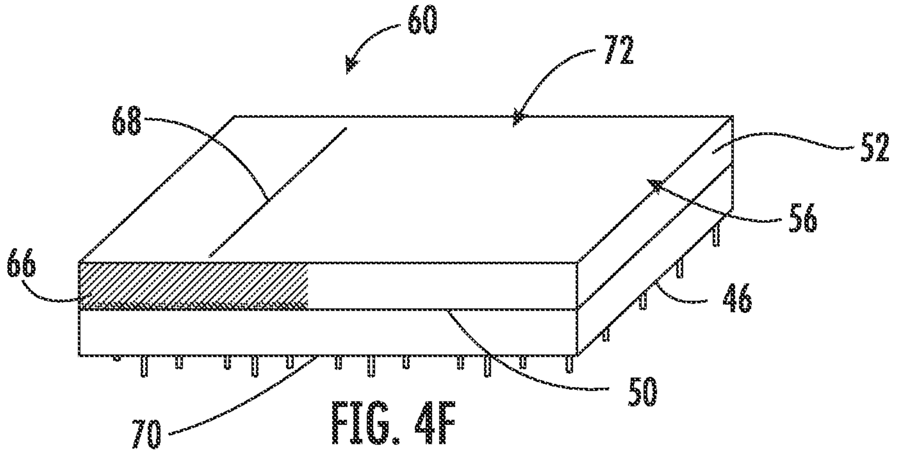

After application of the molding agent, the loosened material 64 is returned to abut or overlap (or be overlapped by) the material on the other side of the slot 62, covering the applied molding agent 66 with material from the cushion pad 52 and forming a seam 68, as shown in FIG. 4F. Accordingly, in this example method, there exists an accumulation of molding agent 66 between the cushion pad 52 and the carpet pile 46, and specifically, between the exposed surface 56 of the cushion pad 52 and the carpet pile backing 50. The accumulation of molding agent 66 is also distributed from one end 70 (or substantially so) to the other end 72 (or substantially so) in the end portion 60 (e.g., across the entire width of the tread). The molding agent 66 is obscured from view, and importantly, will not be directly exposed to a stair or other surface when cured as part of the molded tread.

Figure 4G:
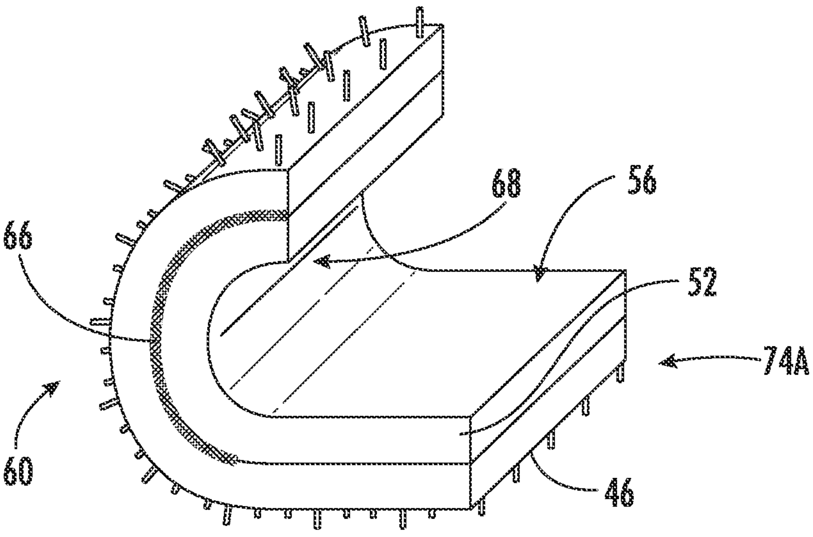

Referring to FIG. 4G, shown in cut-away view is a preliminary molded tread 74A. The preliminary molded tread 74A comprises the carpet pile 46 and cushion pad 52 sandwiching the molding agent 66, with the end portion 60 formed into a desired (predefined) geometric shape (e.g., a rounded shape). In this example, the molding agent 66 may be of a material (e.g., thermoplastic) that, when heated, can be shaped to any desired geometric configuration through a like-shaped molding apparatus (e.g., jig, mold, etc.). While secured in the molding apparatus, the end portion 60 is preserved or maintained in the desired geometric shape while undergoing a curing process. In one embodiment, the curing may be achieved via air-cooling or forced cooling (e.g., cooled through an appropriate heat exchanging apparatus or tubing/conduit proximal to the end portion 60 or while situated in a cooling chamber). As explained above, the curing process may involve an air-drying process or heating process or combination thereof, depending on the type of molding agent used. For purposes of illustration and brevity of description, it is assumed that the method in this example uses a thermoplastic molding agent that is applied above room temperature (e.g., the molding agent 66 is heated to, for instance, four-hundred (400) degrees Fahrenheit, and then applied through the slot 62 in FIGS. 4E-4F), and then naturally or forced air-cooled and/or cooled through another or additional accelerated process (e.g., via a cooling fluid or gas applied proximally to the end portion 60 to accelerate the curing process, such as via convection, conduction, or other heat transfer mechanisms). Through the curing process and afterwards, the end portion 60 retains the rounded or bull-nosed shape since the molding agent 66 has cured. The rounded shape enables a conformal fit around a rounded or bull-nose end (outward end) of a stair. Notably, the radius of curvature and/or depth of the rounded end portion 60 is referenced relative to the exposed surface 56 of the cushion pad 52, and each or both parameters may be varied according to the anticipated dimensions and shape of each stair to which the end portion 60 is expected to conform and adhere to. The molding apparatus/assembly that is used to mold the end portion 60 may be a mold or jig in which the end portion 60 is placed under force (e.g., under compression), and then cured (e.g., naturally, accelerated, or a combination thereof) to form the desired geometric configuration as explained below in association with the example of FIG. 6.

Notably, when cured, the exposed surface 56 of the resulting molded tread has a uniform appearance, absent perhaps the discontinuity introduced by the presence of the seam 68 in some embodiments, since the surface 56 consists essentially of the same material, namely, the material of the cushion pad 52, which covers and hence obscures the cured molding agent 66. In some embodiments, the material used in the end portion 60 may be different than that used for the rest of the cushion pad 52, as long as the cured molding agent 66 is covered and adherence to a stair or other surface is not detrimentally impacted. For instance, in some embodiments, a rigid molding agent may be inserted in a pocket integrated in or attached to the end portion 60, which is heated, formed into the desired geometric shape, and then cured. The pocket may be of a different material (or the same in some embodiments) than the rest of the exposed surface 56 of the cushion pad 52.

Figure 4H:
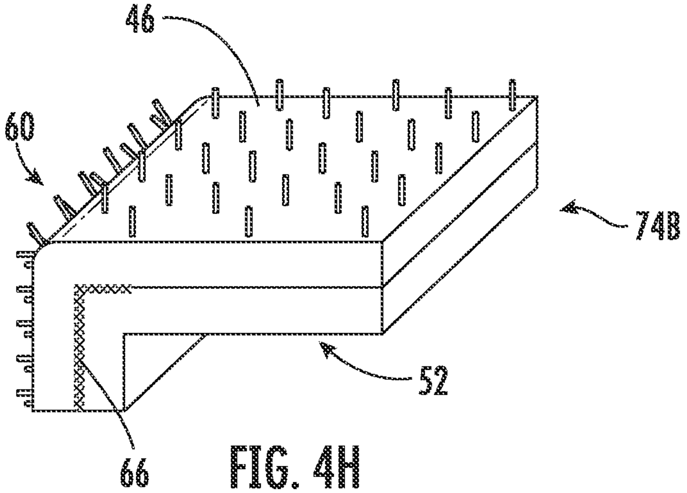

FIG. 4H illustrates the molding of the end portion 60 of a preliminary molded tread 74B comprising the carpet pile 46, cushion pad 52, and molding agent 66 into a square (e.g., L-shaped) geometric configuration, after which the end portion 60 is cured as described above to realize the persistent square geometric shape. In some embodiments, other geometric configurations may be achieved depending on the geometric configuration of the stair (or other structure) upon which the molded tread is to be applied.

The method described in FIGS. 4A-4H may further comprise one or more additional steps in some embodiments. For instance, the method may comprise applying an adhesive (e.g., of suitable material(s) to retain tackiness) to enable the tread to be securely, yet removeably, placed onto a stair. In some embodiments, the method may include applying a releasable wrapper or covering to protect the adhesive before peeling the wrapper/covering off to apply the molded tread, with the now-exposed adhesive, to the stair. Note that one or more of the steps in the various methods described in association with FIGS. 1A through 4H may be combined, omitted, or one or more steps from one method may be substituted with one or more steps from one or more other method. For instance, though a tacky adhesive is described as an optional step to the method described in FIGS. 4A-4H, in some embodiments, a non-slip pad may be used that circumvents the need or desire for a tacky adhesive. As another example, the slot formation described in association with the method of FIGS. 4A-4H may be replaced with needle insertion and molding agent injection. These and/or other variations are contemplated to be within the scope of the invention.

Figure 5A:
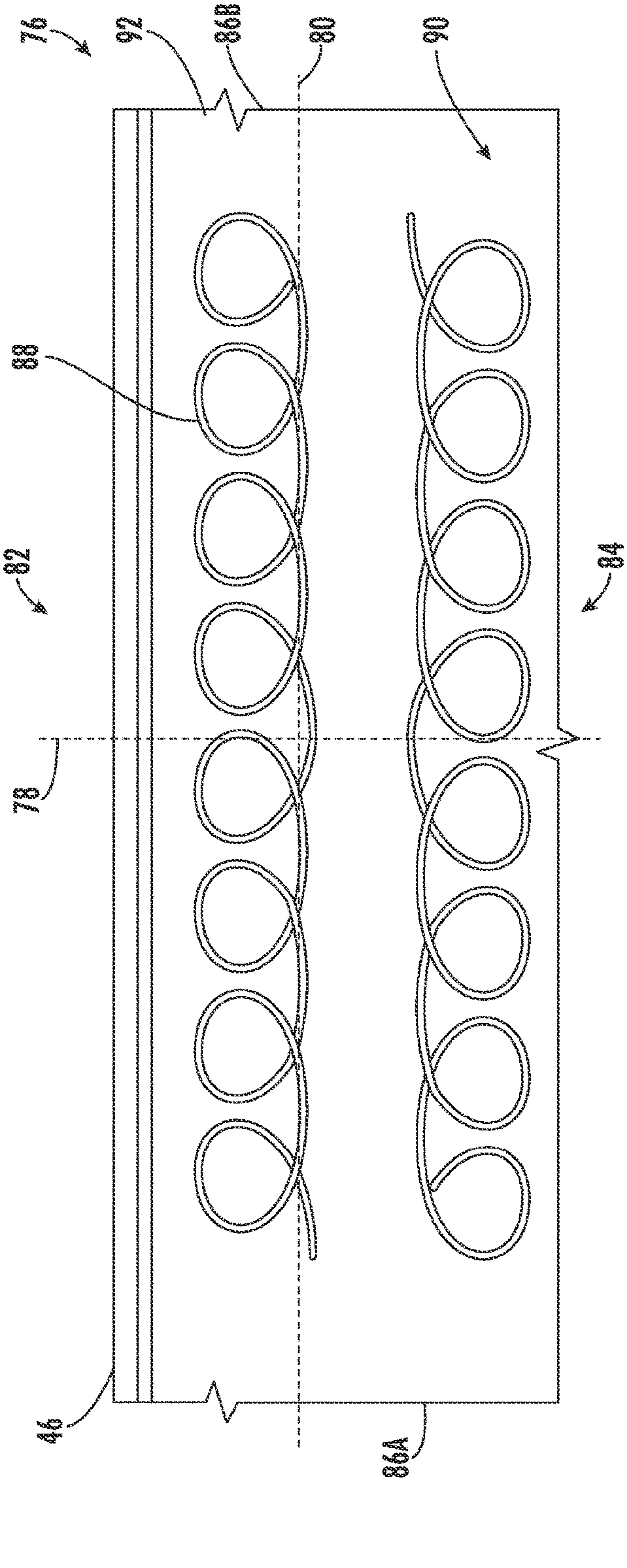
FIGS. 5A-5C are schematic diagrams that illustrate select views of an embodiment of an example molded tread.
Figure 5B:
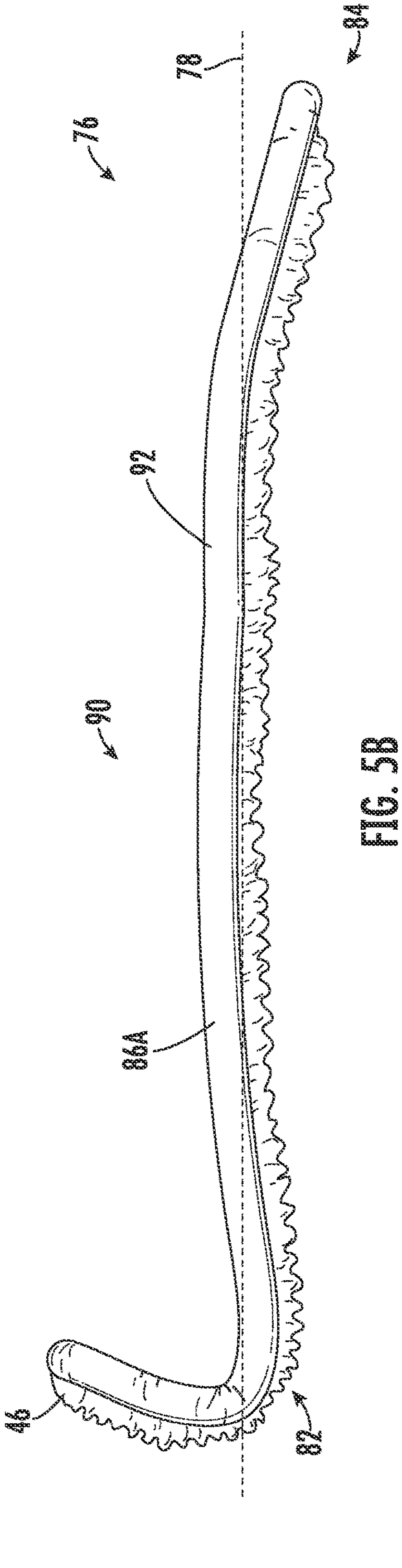
Figure 5C:
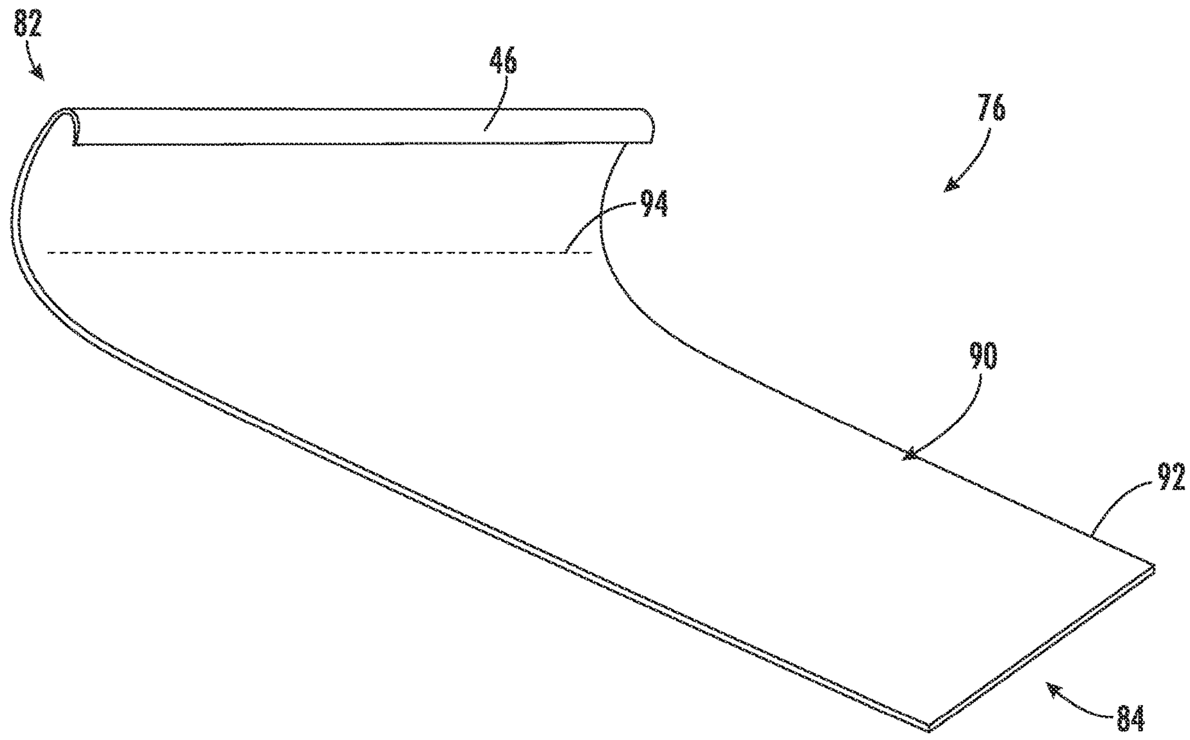

Attention is now directed to FIGS. 5A-5C, which illustrate select views of an embodiment of an example product resulting from any one of the methods described above for FIGS. 1A-4H, and in this example, the product is in the form of a molded tread 76 using a cushion pad attached to the carpet pile 46. It should be appreciated that other layer material may be used in some embodiments, and that the description here is illustrative of one embodiment among other embodiments. FIG. 5A illustrates a bottom plan view of the molded tread 76 (e.g., flipped upside down, or layer side up). FIG. 5B illustrates a side elevation view of the molded tread 76 flipped upside down (layer side up). FIG. 5C illustrates a perspective view of the molded tread 76 (again, layer side up). In one embodiment, the molded tread 76 comprises a first axis 78 that is parallel to the portion of the molded tread 76 that extends along the depth of a stair (e.g., from the nose of the stair to the riser), and a second axis 80 that is transverse to the first axis 78 and parallel (when applied) to the width of the stair. Along the direction or orientation parallel to the first axis 78 is a nose end portion 82 of the molded tread 76, the nose end portion 82 having a molded geometric configuration or shape, or in this example, a rounded end, that conformally covers or wraps around the nose (outward portion) of a stair. Opposing the nose end portion 82 of the molded tread 76 is a riser end 84, where the riser end 84 is intended to abut against or adjacent to the riser of a stair. In some embodiments, the riser end 84 may have a different configuration. Along the second axis 80 are opposing ends 86A, 86B of the molded tread 76. Also shown is a tacky adhesive 88 that is optionally applied to an exposed face or surface 90 of a cushion pad 92. The tacky adhesive 88 is shown applied in two rows in a serpentine manner, though may be applied more or less in other patterns of application, or omitted in some embodiments. The tacky adhesive 88 may be a hot melt adhesive among other known materials that is persistently rubbery and tacky. In some embodiments, the molded tread 76 further comprises a thin, releasable wrapping or covering that loosely adheres to the tacky adhesive 88 and is removed to expose the tacky adhesive 88 when the molded tread 76 is to be applied to the stair.

As best shown in FIG. 5B, the molded tread 76 is generally comprised of a first, substantially planar portion that extends from the riser end 84 to the commencement of the nose end portion 82, which in some embodiments may be anywhere from approximately four to six (4-6) inches from an end or edge of the nose end portion 82. The nose end portion 82 covers the area between the commencement of the nose end portion 82 to the edge of the nose end portion 82 (e.g., edge of the rounded portion), and includes the transverse end-to-end (or substantially end-to-end transverse) dimensions. In some embodiments, the distance from the nose end portion edge may be less than or greater than 4-6 inches, depending on such factors as intended use (e.g., outdoor, indoor, extent of foot traffic, etc.), dimensions of the tread, materials used, among other factors. In some embodiments, the commencement of the nose end portion 82 may be proximal to a seam 94 (FIG. 5C) corresponding to the opening or slot through which molding agent is applied. Note that the seam 94 is shown with a dashed line, signifying or representing that the seam 94 is optional (e.g., depending on the method used to form the molded tread), as explained above. The substantially planar section extends along the first axis 78 to the commencement of the nose end portion 82, after which the molded tread 76 comprises the geometric shape or configuration until the edge of the nose end portion 82.

As best shown in FIG. 5C, the optional (optional in the sense that it is dependent on the process used) seam 94 corresponding to the closed slot (e.g., slot 62, FIG. 4E) is illustrated as extending transversely across the exposed face/surface 90 of the cushion pad 92. The seam 94 essentially reveals the junction where loosened material (e.g., loosened material 64, FIG. 4E) on one (or in some embodiments, both sides) of the slot 62 were butted-up against or overlapped after injecting/applying the molding agent, enabling in some embodiments a substantially uniform appearance and/or texture of the face exposed face/surface 90, by an observer, and improved and/or more robust adhesion or conformal covering of the molded tread 76 to a stair.

Figure 6:
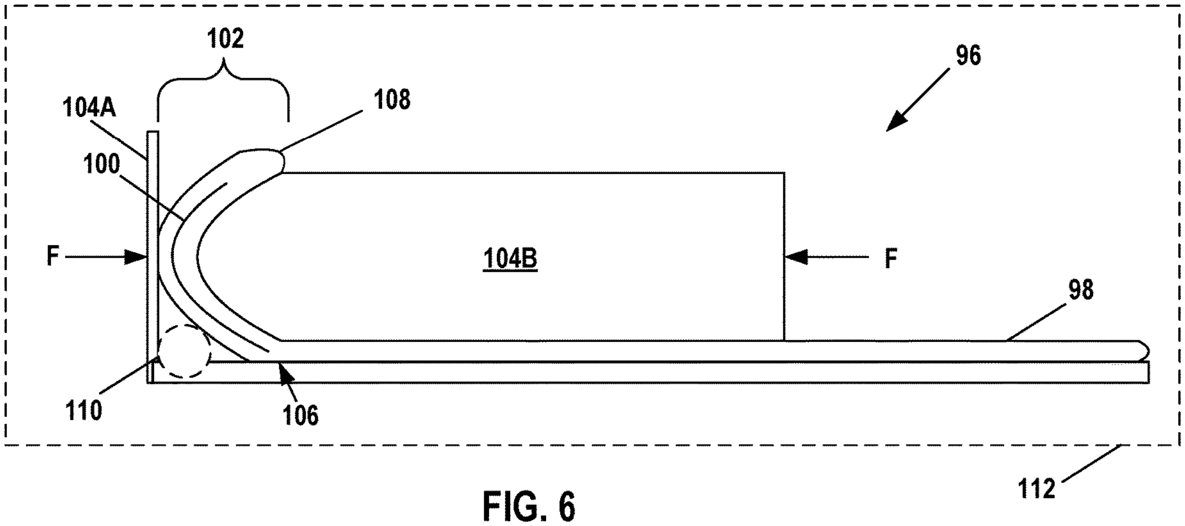
FIG. 6 is a schematic diagram that conceptually illustrates an example method of forming a predefined geometric shape on an end portion of a tread.

Referring now to FIG. 6, shown is a conceptual illustration of a method 96 for molding a tread 98. For instance, the tread 98 comprises a molding agent 100 sandwiched in an end portion (e.g., nose end portion) 102 between a carpet pile and layer (e.g., cushion pad, plastic, etc.). At least the end portion 102 is inserted in a molding apparatus 104 comprising an upstanding wall 104A and a mold 1046 shaped in part according to the desired geometric configuration. In this example, the mold 1046 is shaped in a rounded geometric configuration. The end portion 102 extends between a location or junction 106 that delineates the commencement of the end portion 102 (e.g., proximal to a seam, where molding agent has been injected, or where the change in shape begins) and the end or edge 108 of the rounded end portion 102. In some embodiments, for instance for a twelve inch deep by twenty-seven inch wide (12"×27") molded tread, the end portion 102 may extend from 1 or 2 to 4 inches in depth, or 1 or 2 to 6 inches in depth, though in some embodiments, the end portion 102 may commence and/or extend a different dimension in depth for the same or other size molded treads. For instance, depending on the application, treads may be any one of many varied dimensions, including approximately ten (10) inches wide to five (5) feet wide, and/or three (3) inches in depth to twenty (20) feet in depth, among other dimensions. The mold 104B may be forced in the direction of the upstanding wall 104A (e.g., manually, such as via use of a vice or clamps, or automatically, via activation of a press, etc.), causing compression forces (F) of the tread 98 at the end portion 102 and of the formation of the molding agent 100 into the rounded shape of the mold 104B.

The molding agent 100 may be cured according to any one or a combination of heat, cooling, drying, or forced (e.g., accelerated, such as via forced air, liquid, gas), or natural (e.g., extended lapse of time, such as via natural convection, etc.) techniques. For instance, a conduit 110 running proximal to the end portion 102 and along the width of the tread 98) may run cooled (or heated) fluid/air therethrough, accelerating the curing process through a heat exchange process. As another example, the tread 98 may be placed in a chamber 112 that facilitates the curing process (e.g., oven, refrigerator, etc.). The time elapsed for curing the molding agent 100 may differ depending on a variety of parameters and/or conditions, including the type of molding agent 100, the curing method, and the size of the end portion 102. In one embodiment, once the molding agent 100 has cured, the (compression) forces are removed, and the tread 98 (now a molded tread) is released from the molding apparatus 104.

It should be appreciated that the molding method 96 illustrated in, and described in association with, FIG. 6, is one example method, and that in some embodiments, other molding methods may be used using any one of a plurality of different known molding apparatuses.

Figure 7:
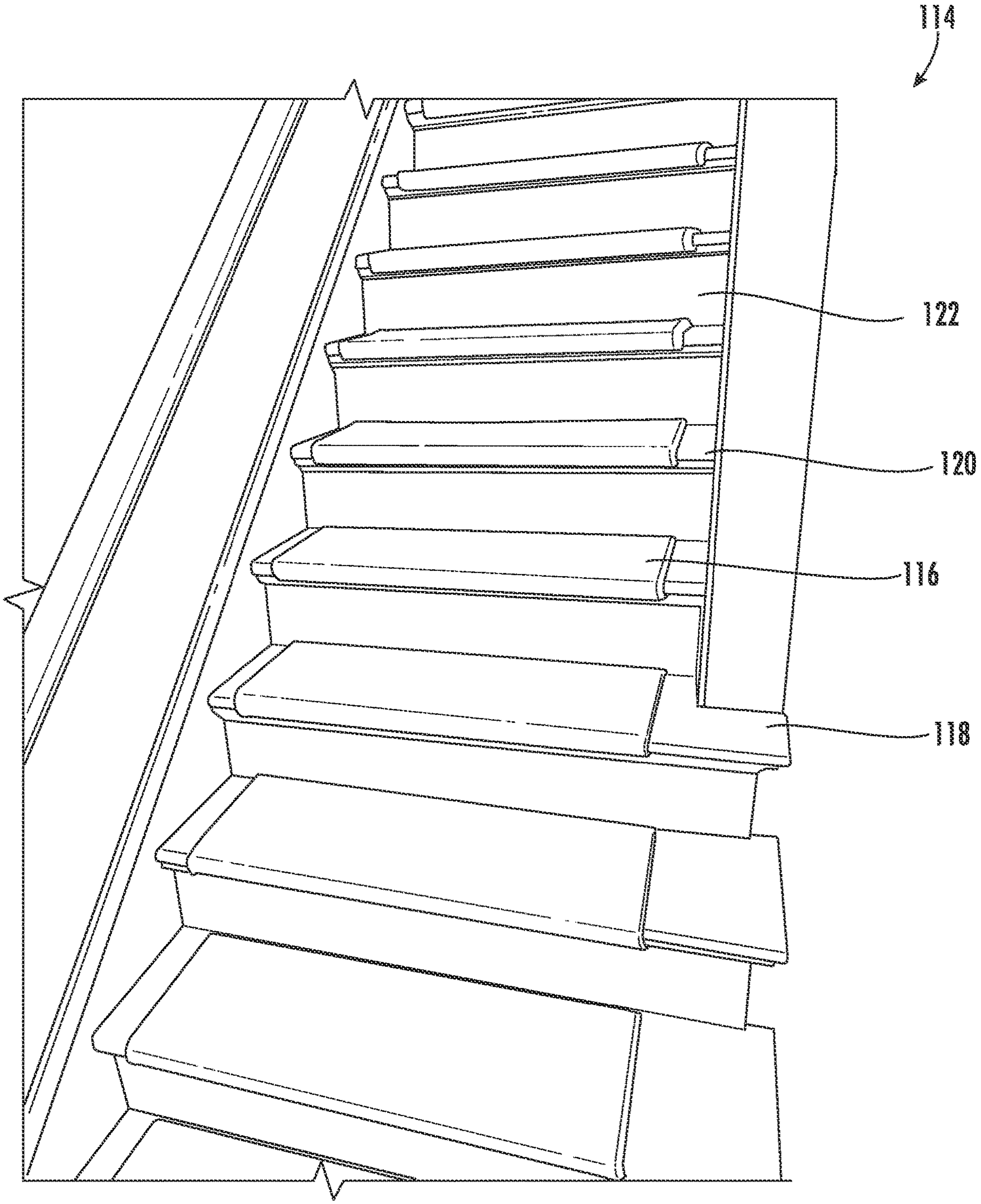
FIG. 7 is a schematic diagram that illustrates an example application of an embodiment of molded treads.

FIG. 7 is a schematic diagram that illustrates an example application of an embodiment of molded treads. In this example, the application is a staircase application 114, where a plurality of molded treads 116 are correspondingly mounted to a plurality of stairs 118 of a staircase. The molded treads 116 conformally cover each nose 120 of each stair 118, and extend in depth to each riser 122. Practically, each molded tread 116 covers a substantial portion of each stair 118, with the opposing outside portions or areas of each stair 118 having no molded tread 116 to enable the stair texture and/or surface to be at least partially exposed via those outside portions. The amount of coverage afforded by each molded tread 116 may be configured differently according to the desired aesthetics of the design.

Figure 8:
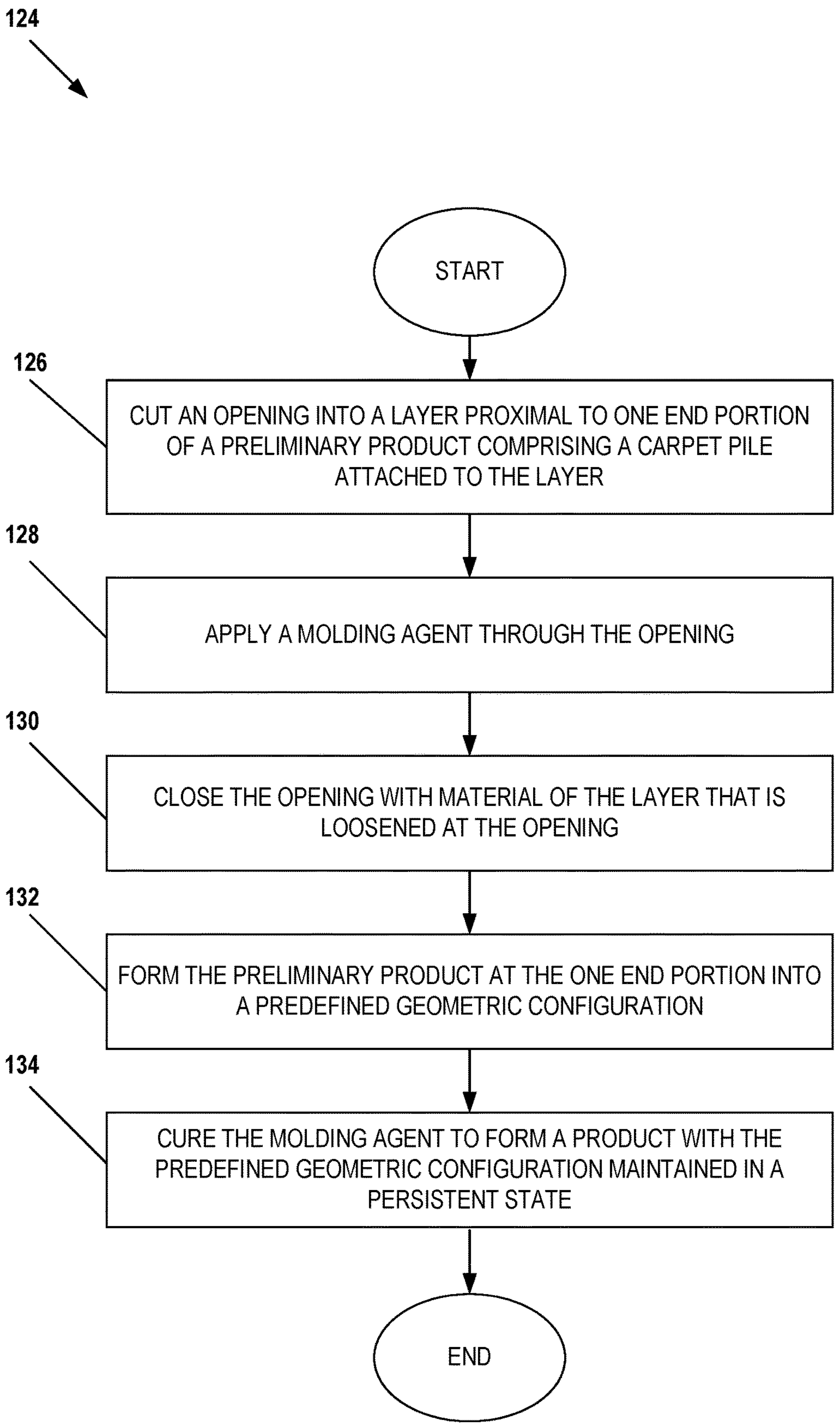
FIG. 8 is a flow diagram that illustrates an embodiment of an example method of manufacturing a molded tread via applying a molding agent through an opening in a surface of a material used in manufacturing a molded tread.

In view of the above description pertaining to the methods of FIGS. 4A-4H, it should be appreciated by one having ordinary skill in the art, in the context of the present disclosure, that one embodiment of an example method of manufacturing a molded tread, depicted as method 124 in FIG. 8, comprises cutting an opening into a layer (e.g., cushion pad, non-slip pad, etc.) proximal to one end portion of a preliminary product comprising a carpet pile attached to the layer (126); applying a molding agent through the opening (128); closing the opening with material of the layer that is loosened at the opening (130); forming the preliminary product at the one end portion into a predefined geometric configuration (132); and curing the molding agent to form a product with the predefined geometric configuration maintained in a persistent state (134). The forming (132) and curing (134) are collectively referred to as molding, and may include heating, cooling, drying, or a combination of heating/drying or cooling/drying.

Figure 9:
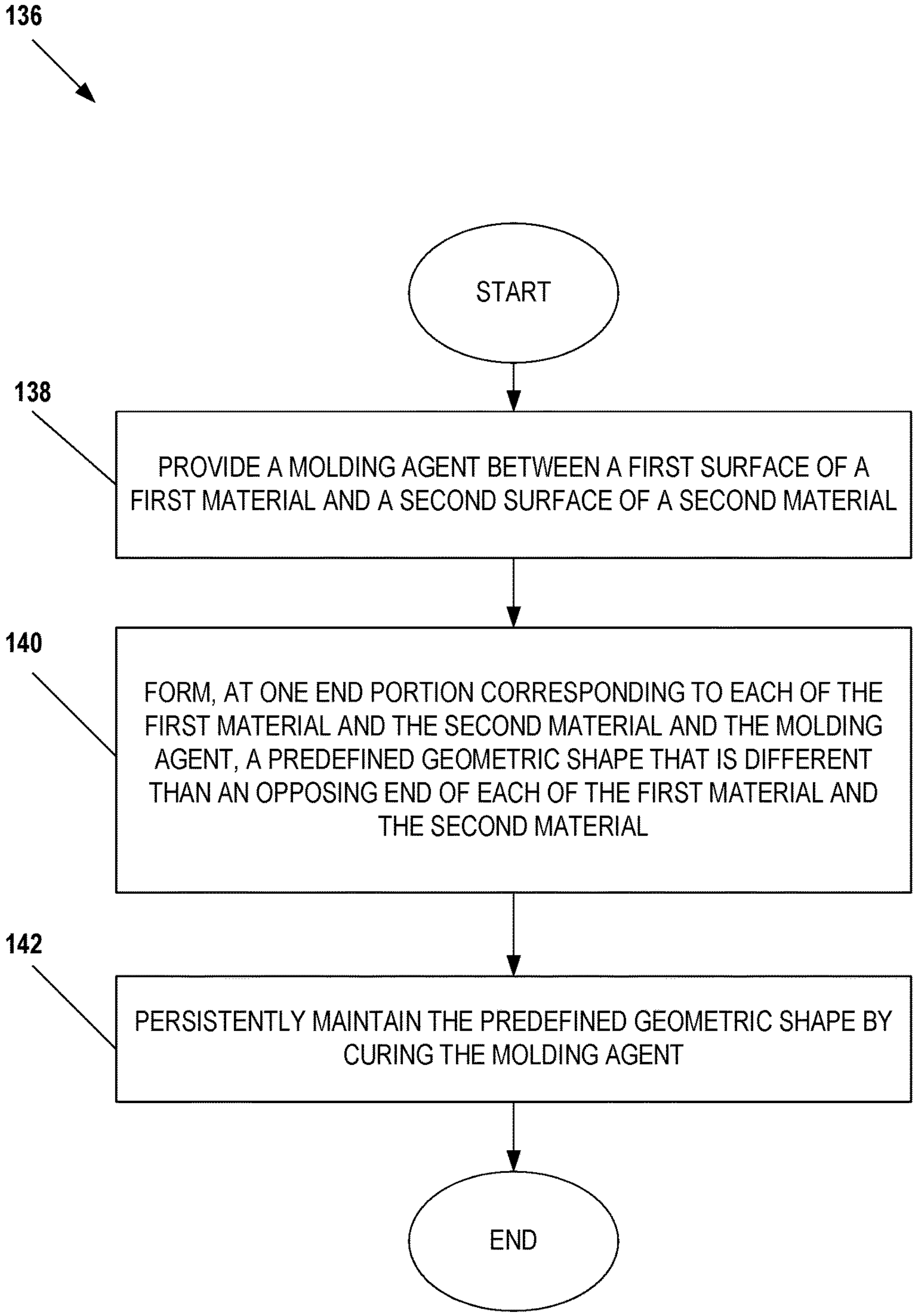
FIG. 9 is a flow diagram that illustrates an embodiment of an example general method of manufacturing a molded tread or other product used in covering an edge.

In yet another embodiment pertaining generally to the methods described herein, it should be appreciated by one having ordinary skill in the art, in the context of the present disclosure, that a method of forming a product used in covering an edge or a product configured as a tread, denoted as method 136 and depicted in FIG. 9, comprises providing a molding agent between a first surface of a first material and a second surface of a second material (138); forming, at one end portion corresponding to each of the first material and the second material and the molding agent, a predefined geometric shape that is different than an opposing end of each of the first material and the second material (140); and persistently maintaining the predefined geometric shape by curing the molding agent (142).

Note that reference to first and second is merely used to distinguish components, and is not necessarily intended to correspond to any use of the terms, first and second, from the above description. Further, reference to material disposed or located between two materials or two surfaces does not necessarily exclude additional intervening materials/surfaces in some embodiments.

Any process descriptions or blocks in flow diagrams should be understood as representing automated logic and/or steps in a process, and alternate implementations are included within the scope of the embodiments in which functions may be executed out of order from that shown or discussed, including substantially concurrently, or with additional steps (or fewer steps), depending on the functionality involved, as would be understood by those reasonably skilled in the art of the present disclosure.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

The invention claimed is:

1. A product used in covering a rigid edge of a structure, the rigid edge having a fixed geometric shape, the product comprising:

a first material comprising a first end portion and a first surface;

a second material comprising a second end portion and a second surface; and a cured molding agent disposed between, and covered by, the first surface and the second surface of each of the first and second end portions, wherein the first end portion of the first material and the second end portion of the second material comprise a first geometric shape corresponding to a shape of the cured molding agent that is disposed between the first surface and the second surface in said first and second end portions, the first geometric shape conforming to the fixed geometric shape of the rigid edge, and wherein said first and second materials each further comprises an opposing end, each opposing end having a surface and a different geometric shape than the first geometric shape; and wherein each opposing end of said first material and said second material are opposite to said end portions of the first material and the second material; and further wherein said first material and said second material are joined together at said surface of the opposing ends of each of the first and second materials.

2. The product of claim 1, further comprising a seam that is visible along the first surface and extending in a direction transverse to an axis extending between the first and second end portions and the opposing end of the first and second materials.

3. The product of claim 2, wherein the second material comprises a carpet pile attached to the first material.

4. The product of claim 1, wherein the first geometric shape comprises a round or square shape.

5. The product of claim 1, wherein the product comprises a stair tread, step tread, or edge covering.

6. The product of claim 1, wherein the first material comprises a first length and a first width, the first length defined by a first end of the first end portion and the opposing end of the first material, and wherein the second material comprises a second length and second width, the second length defined by a third end of the second end portion and the opposing end of the second material, and wherein the first end portion comprises a first area defined by the first end on one end of the first area and proximal to a commencement of the first geometric shape, along an axis transverse to the first length and the second length, on an opposing end of the first area, and the second end portion comprises a second area coincident with the first area.

7. The product of claim 1, wherein the first material comprises a first perimeter, and the second material comprises a second perimeter, wherein the first material and the second material are joined to each other along the first perimeter and the second perimeter.

8. The product of claim 1, wherein the first and second end portions are dimensioned to conformally fit over a nose of the structure, the structure comprising a stair.

* * * * *